Oct. 16, 1956     T. RASPET     2,766,798
REVERSIBLE PAWL NUT LOCKING MEANS
Filed April 18, 1955
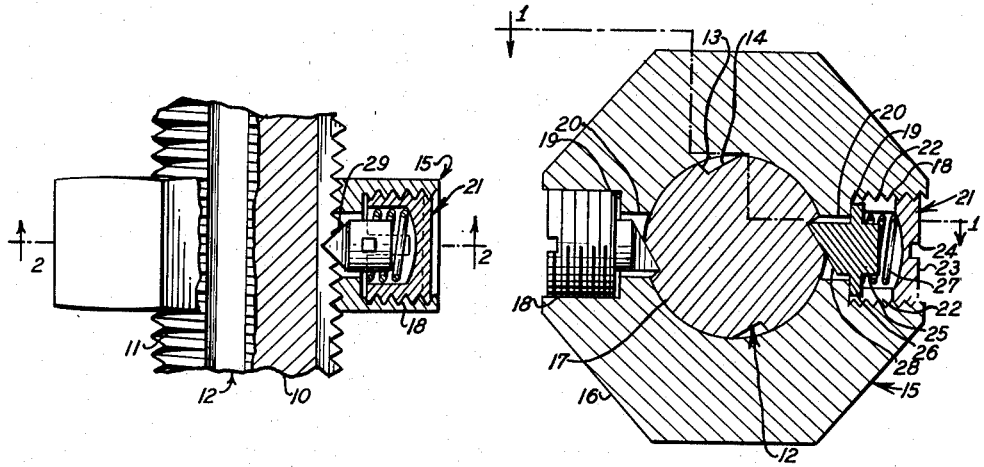
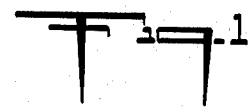
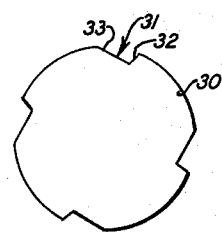
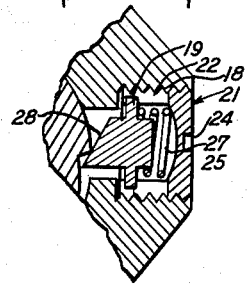
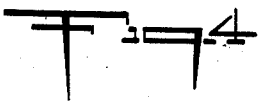
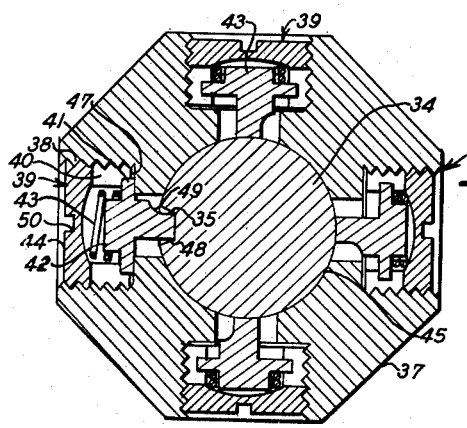
INVENTOR
THOMAS RASPET
BY *Jacobi & Jacobi*
ATTORNEYS United States Patent Office 2,766,798
Patented Oct. 16, 1956

2,766,798

REVERSIBLE PAWL NUT LOCKING MEANS

Thomas Raspet, Chelan, Wash.

Application April 18, 1955, Serial No. 502,107

2 Claims. (Cl. 151—11)

This invention relates to screw-threaded fastening means and more particularly to a bolt and nut for co-operation and threaded engagement with each other and with means incorporated in the nut for preventing retrograde rotation of the nut with respect to the bolt, which means may be conveniently adjusted to permit such retrograde rotation.

Heretofore, many different types of nut-locks and combination bolts and nuts in cooperating locking means have been proposed and utilized, but many of these were the frictional variety which did not provide a positive locking means for preventing retrograde rotation of the nut with respect to the bolt. Also, many of these prior art locking devices which provided positive locking means were inconvenient to adjust in order to permit retrograde rotation of the nut with respect to the bolt and in many instances, such locking means only permitted locking of the nut in one position with relation to the bolt and consequently, it was frequently impossible to adequately tighten the nut.

It is accordingly an object of this invention to provide a bolt and nut for threaded engagement therewith and in which the nut is provided with locking means to prevent retrograde rotation of the nut with respect to the bolt and which locking means is conveniently adjustable to permit such retrograde rotation.

A further object of the invention is the provision of a bolt and nut for threaded engagement therewith, in which the nut is provided with locking means in the form of ratchet pawls for permitting rotation of the nut to tighten the same and for preventing retrograde rotation of such nut.

A still further object of the invention is the provision of a bolt and nut for threaded cooperation therewith in which the nut is provided with locking means for preventing retrograde rotation of the nut with respect to the bolt and in which such locking means is adaptable for use with left-hand threads as well as right-hand threads.

A still further object of the invention is the provision of a bolt and nut for threaded cooperation therewith in which the nut incorporates locking features for preventing retrograde rotation of the nut with respect to the bolt and in which such locking features are operative at 90 degree intervals.

A further object of the invention is the provision of a bolt and nut for threaded cooperation therewith, in which the nut is provided with locking means for preventing retrograde rotation of the nut with respect to the bolt and in which such locking means may be conveniently adjusted without the use of special tools other than a conventional screwdriver.

A further object of the invention is the provision of a bolt and nut for threaded cooperation therewith, in which the nut is provided with locking means for preventing retrograde rotation of the nut with respect to the bolt and in which such locking means does not, in any way, mutilate or damage the threads of either the nut or the bolt.

A still further object of the invention is the provision of a bolt and nut for threaded cooperation therewith, in which the bolt may be provided with a keyway and in which the nut may be provided with locking means for cooperating with such keyway to prevent retrograde rotation of the nut with respect to the bolt and in which the locking means is adjustable to permit such retrograde rotation.

Another object of the invention is the provision of a bolt and nut for threaded cooperation therewith, in which the nut is provided with locking means for preventing relative rotation in one direction with respect to the bolt and in which the only parts subject to wear are locking pawls which may be conveniently removed and replaced.

Further objects and advantages of the invention will be apparent from the following description taken in conjunction with the accompanying drawing wherein:

Fig. 1 is a fragmentary sectional view taken substantially on the line 1—1 of Fig. 2;

Fig. 2, a longitudinal sectional view taken substantially on the line 2—2 of Fig. 1;

Fig. 3, a fragmentary sectional view showing the locking means adjusted to permit retrograde movement of the nut with respect to the bolt;

Fig. 4, an end elevational view showing a bolt provided with grooves to cooperate with the locking means disposed in the nut where the engaging threads of the nut and bolt are of the left-hand variety; and Fig. 5, a longitudinal sectional view similar to Fig. 2, but showing a slightly modified form of locknig means for cooperating with the keyway provided in the bolt.

With continued reference to the drawing there is shown an elongated bolt 10 provided with right-hand threads 11 and also provided with a plurality of longitudinally extending grooves 12. As best shown in Fig. 2, the grooves 12 are provided with one wall 13 which provides an abutment and with another wall 14 which is inclined from the inner end of the wall 13 outwardly to the peripheral surface of the bolt 10. The bolt 10 may be of any desired length and the grooves 12 need extend only throughout the threaded portion of the bolt 10.

Threadedly engaged with the bolt 10 is a nut 15 which may be hexagonal in shape to provide wrench-engaging surfaces 16, but, of course, if desired, the nut 15 may be made of any suitable configuration and rotated in any desired manner. The nut 15 is provided with an internally threaded aperture 17 which serves to threadedly receive the bolt 10 and the nut 15 is also provided with diametrically disposed, threaded, radial bores 18 extending inwardly from the outer surface of the nut 15 and terminating in shoulders 19 outwardly of the aperture 17. The nut 15 is also provided with counter-bores 20 of reduced diameter communicating with the bores 19 and with the aperture 17.

A cup-shaped plug 21 is threadedly received in each bore 18 with the plug 21 opening inwardly and in the peripheral wall of each plug 21 are diametrically disposed slots 22. The outer wall 23 of each plug 21 is provided with a screwdriver receiving slot 24, the purpose of which will be later described.

A pawl 25 is slidably received in each plug 21 and each pawl 25 is provided with diametrically disposed projections 26 which are slidably received in the slots 22 in the plugs 21 and prevent relative rotation between the pawls 25 and the plugs 21. The projections 26 also engage the shoulders 19 and prevent inward movement of the pawls 25 beyond a predetermined point. Disposed between each pawl 25 and the inner surface of the end wall 23 of each plug 21, is a compression spring 27 which serves to urge the pawls 25 inwardly. The inner end of each pawl 25 is provided with a surface 28, inclined in one direction and extending entirely across the end face of the pawl 25 to provide a ratchet tooth and at right angles of the inclined surface 28, as best shown in Fig. 1, the inner end of the pawl 25 is provided with diametrically disposed projecforming the V serving to engage with the threads 11 of the bolt 10.

With the pawls 25 in the position shown in Fig. 2, the nut 15 may be rotated in a clockwise direction to advance the same on the bolt 10 and it will be noted that the inclined surfaces 28 of the pawls 25 will serve to cam the pawls outwardly against the action of compression spring 27 during such rotation the pawls 25 acting as ratchet teeth and permitting rotation in a clockwise direction, but upon rotation in a counter-clockwise direction, the pawls will engage the abutment surfaces 13 of the grooves 12 and pervent such counter-clockwise or retrograde rotation of the nut 15 with respect to the bolt 10. The nut 15 may be advanced to the desired position on the bolt 10 and the pawls 25 in engagement with the abutment walls 13 of the grooves 12 will lock the nut 15 in such position and it is to be noted, that since four grooves 12 are provided in the botl 10, that the nut 15 may be locked in any desired 90 degree point of rotation with respect to the bolt 10. Since diametrically opposed locking pawls 25 are provided, the locking force will be evenly distributed throughout the nut 15 and consequently, ample strength is provided and a positive lock results, which will prevent all retrograde rotation of the nut 15 with respect to the bolt 10.

When it is desired to rotate the nut 15 in a counter-clockwise direction, as viewed in Fig. 2, to remove the nut 15 from the bolt 10, it is only necessary to engage a screwdriver with the screwdriver slots 24 in the plug 23 and rotate such plugs 180 degrees which will serve to rotate the locking pawls 25 to the position shown in Fig. 3, whereupon the inclined end surfaces 28 on the pawls 25 will engage the abutment wall 13 of screws 12 and act as a cam to move the pawls outwardly thereby permitting counter-clockwise or retrograde rotation of the nut 15 with respect to the bolt 10. When it is desired to reapply the nut 15 to the bolt 10 it is only necessary to rotate the plugs 23 and pawls 25 to the original position shown in Fig. 2, whereupon the nut 15 will be locked in any desired position.

The locking features of this invention, as described above, are equally applicable to a bolt and nut having cooperating left-hand threads, it only being necessary to form the grooves 12 in the opposite direction. As shown in Fig. 4, a bolt 30 may be provided with grooves extending longitudinally thereof and designated 31, such grooves being provided with an abutment surface 32 which corresponds with the abutment surface 13 of the grooves 12, but facing in the opposite direction and with an inclined surface 33 which extends in the opposite direction to the surface 14 of the grooves 12. The operation of the locking means is identical with that described above, and is as effective on a bolt having left-hand threads as on one having right-hand threads since the locking action is the same.

Since it is frequently desirable to apply a nut to a threaded shaft or bolt having a keyway therein and to lock the nut with respect to the bolt, the locking features of this invention may be also utilized in such a structure. With particular reference to Fig. 5, there is shown a bolt or shaft 34 which may be provided with external threads, not shown, and also with a longitudinally extending keyway 35, which in common with most keyways is square in cross section. Threadedly received on the shaft or bolt 34 is a nut 36 which may be provided with wrench-engaging surfaces 37 and in order to permit locking of the nut 36 at every 90 degree point of rotation, the same may be provided with four radially extending, threaded bores 38 which serve to threadedly receive cup-shaped plugs 39 similar to the plugs 21, described above. These plugs 39 are likewise provided with diametrically disposed slots 40 which serve to slidably receive projections 41 of locking pawls 42 to permit sliding movement of such pawls with respect to the plugs 31, but to prevent relative rotation therebetween. The pawls 42 are urged inwardly by compression springs 43 disposed between the outer end wall 44 of each plug 39 and the projections 41 on the pawls 42. Communicating with the threaded bore 38 and with the threaded aperture 45 in the nut 36 is a counter-bore 46 of reduced diameter which served to provide a shoulder 47 for engagement by the projection 41 which limits inward movement of the pawls 42 under the action of compression springs 43.

The inner end of the pawl 42 may be provided with a substantially square projection 48 which serves to engage in the keyway 35 and prevent relative rotation between the nut 36 and the shaft or bolt 34 and each projection 48 is provided on one side thereof with a curved cam surface 49 which operates to cam the pawl 42 outwardly when the nut 36 is rotated in a clockwise direction as shown in Fig. 5.

As in the first described form of the invention, the pawl 42 may be rotated to permit movement of the nut 36 in either direction by engagement of a conventional screwdriver in a screwdriver slot 50 provided in the outer end wall 44 of the plug 39 and since four locking pawls 42 are provided in the nut 36, it will be seen that the same may be locked in each 90 degree position of rotation with respect to the shaft or bolt 34.

It will be seen that by the above described invention there has been provided a locking means to provide a positive lock between a nut and a bolt on which the same is threadedly received and which locking means may be utilized on either right-hand or left-hand threaded fastening means and furthermore, such locking means may be conveniently adapted for use on a shaft having a single keyway of square cross section therein to effectively lock a nut against rotation on such shaft or bolt. Furthermore, the locking means of this invention may be conveniently and economically manufactured from readily available materials and the only part subjected to wear are the locking pawls which may be conveniently removed and replaced, when necessary. In order to adjust the locking means for permitting relative rotation between the nut and bolt or for locking the same against rotation in one direction, it is only necessary to utilize a conventional screwdriver, thereby eliminating the necessity of providing special tools or wrenches.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A device of the character described comprising an elongated threaded bolt, a plurality of circumferentially spaced longitudinally extending grooves in the peripheral surface of said bolt, each groove having a wall providing an abutment, a nut comprising a body having a threaded aperture for threadedly engaging said bolt, wrench-engaging surfaces on the peripheral surface of said body, diametrically disposed threaded radial bores in said body extending from the peripheral surface and terminating outwardly of said aperture, counterbores of reduced diameters communicating with said bores and said aperture and providing shoulders, a cup-shaped plug threadedly received in each bore and opening inwardly, diametrically disposed slots in the peripheral wall of each plug, a pawl slidably received in each plug, projections on each pawl slidably received in said slots to prevent rotation of said pawls with respect to said plugs and engaging said shoulders to limit radial inward movement of said pawls, a compression spring disposed between each pawl and the end wall of the associated plug to urge said pawls inwardly, the inner end of each pawl being inclined in one direction to provide a ratchet tooth and being of V-shape at right angles thereto for engaging with the threads of said bolt and a screwdriver slot in the outer surface of the end wall of each plug to facilitate rotation of each plug and pawl to position said pawls for engagement with said abutments to prevent retrograde rotation of said nut on said bolt and to position each pawl with the inclined inner end in engagement with said abutments to permit retrograde rotation of said nut on said bolt.

2. A device of the character described comprising an elongated threaded bolt, a plurality of circumferentially spaced longitudinally extending grooves in the peripheral surface of said bolt, each groove having a wall providing an abutment, a nut comprising a body having a threaded aperture for threadedly engaging said bolt, diametrically disposed threaded radial bores in said body extending from the peripheral surface and terminating outwardly of said aperture, counter-bores of reduced diameter communicating with said bores and said aperture and providing shoulders, a cup-shaped plug threadedly received in each bore and opening inwardly, diametrically disposed slots in the peripheral wall of each plug, a pawl slidably received in each plug, projections on each pawl slidably received in said slots to prevent rotation of said pawls with respect to said plugs and engaging said shoulders to limit inward radial movement of said pawls, a compression spring disposed between each pawl and the end wall of the associated plug to urge said pawls inwardly, the inner end of each pawl being inclined in one direction to provide a ratchet tooth and a screwdriver slot in the outer surface of the end wall of each plug and pawl to position said pawls for engagement with said abutments to prevent retrograde rotation of said nut on said bolt.

References Cited in the file of this patent
UNITED STATES PATENTS

| | | |
|---|---|---|
| 224,630 | Beach | Feb. 17, 1880 |
| 523,549 | Schwalbe | July 24, 1894 |
| 1,599,189 | Smith | Sept. 7, 1926 |
| 1,781,936 | Stoltzlen | Nov. 18, 1930 |

FOREIGN PATENTS

| | | |
|---|---|---|
| 232,097 | Great Britain | Apr. 16, 1925 |